United States Patent Office 3,505,119
Patented Apr. 7, 1970

3,505,119
FLUID SUPPLY SYSTEMS
Peter James Gillespie, Walton-on-Thames, England, assignor to Energy Conversion Limited, London, England, a British company
Filed Nov. 10, 1966, Ser. No. 593,459
Claims priority, application Great Britain, Nov. 17, 1965, 48,952/65
Int. Cl. H01m 27/00
U.S. Cl. 136—86                              3 Claims

ABSTRACT OF THE DISCLOSURE

Fuel cells are constructed to include a pump for the oxidant supply to the cell which is operated by energy derived from pressurized fuel used in the cell operation enabling the oxidant supply to be automatically controlled in proportion to the fuel supply. The oxidant supply is advantageously in stoichiometric excess and a by-pass circuit uses excess oxidant to remove moisture and control the electrolyte concentration.

A fluid supply system of the kind described is arranged in accordance with one aspect of the invention, so that pressure energy of the pressurised fluid performs useful work. Where, for example, a pressurised fluid is used in a particular system involving the flow of at least one other fluid, at least some of the pressure energy of the pressurised fluid may be used to cause or assist said flow of the or a further fluid in the system. The fluids may be gaseous, vaporous or liquid. Thus in a fuel cell system of the circulating electrolyte type and in which the fuel is supplied from a pressurised source, it may be arranged that pressure energy of the source is used to cause or assist the circulation of the electrolyte.

The invention may be applied to the feeding of fluids in a system in given proportions by arranging that the release of the pressure energy of the one fluid when that fluid is fed in the system is used to operate a pump or pumps for the one or more other fluids, the delivery of the pump(s) being such as to feed the other fluid(s) in the required proportion. Such a pump may be adapted to be of variable delivery.

In cases where a pressurised fuel supply system is associated with power producing means, it has been usual hitherto for feed or supply means for another fluid in the system to be operated by the use of energy derived from the power output. In a system in accordance with the invention, however, power for such operations may be derived from the pressure energy of the pressurised fluid and none of the power output is required to be expended parasitically for such purposes; the efficiency of the system is therefore considerably enhanced by use of the invention.

Figure 1:
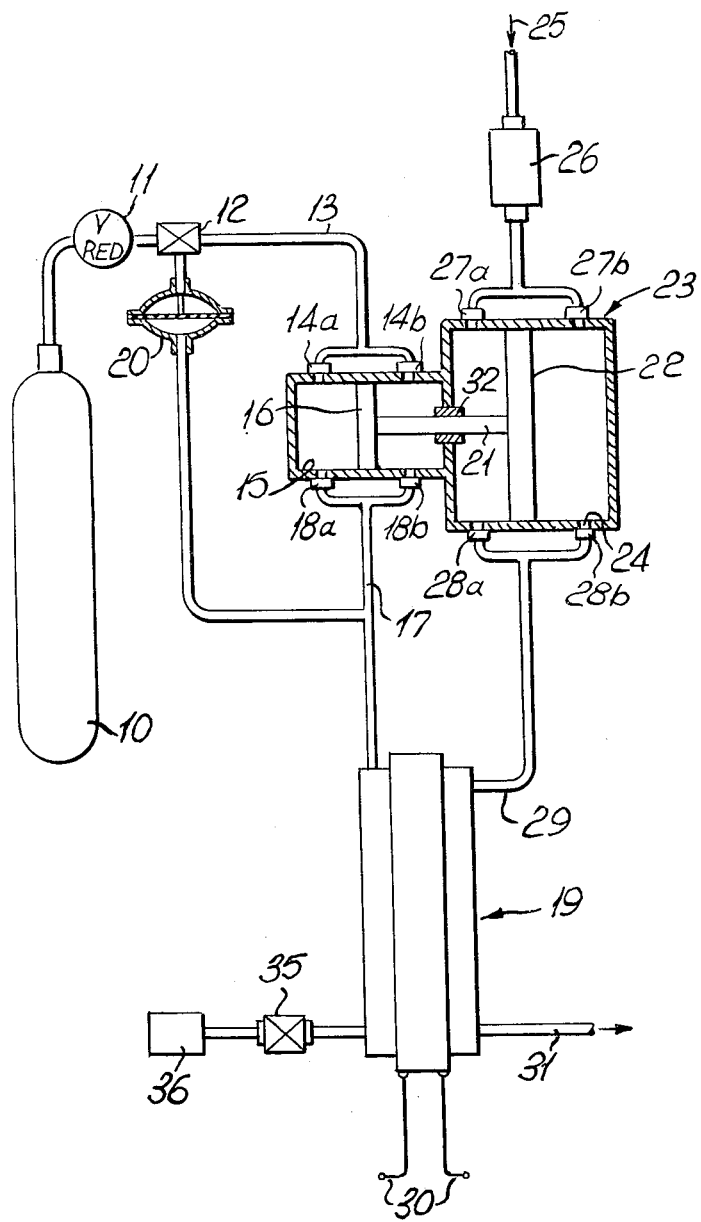
Figure 2:
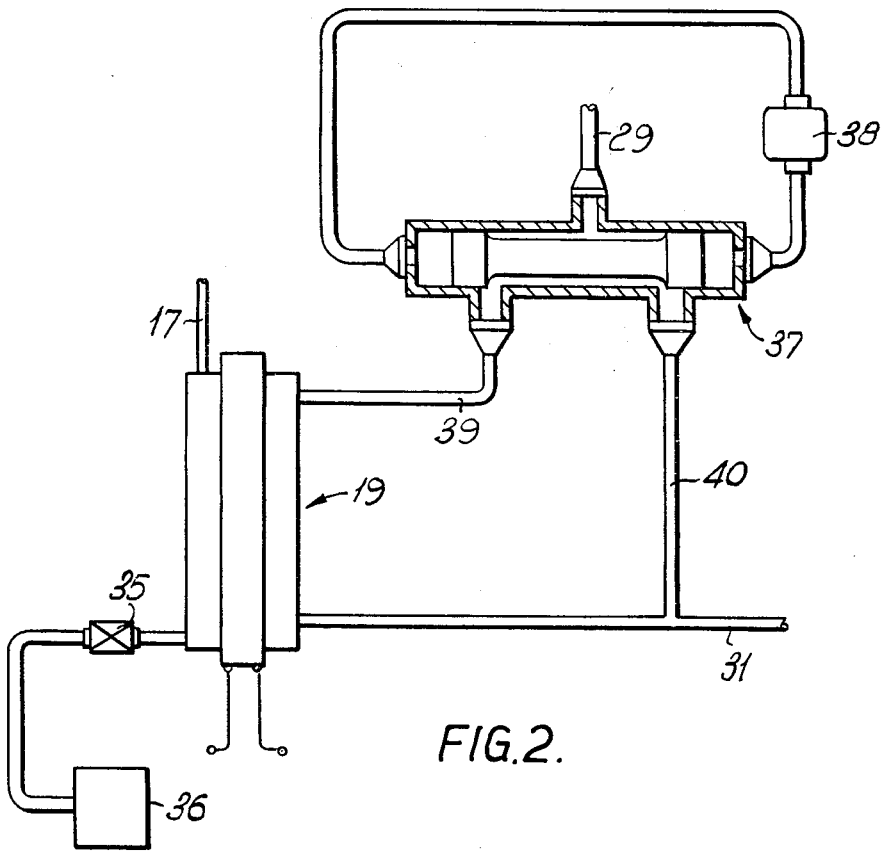

The invention is particularly applicable to the operation of fuel cells wherein the fuel gas, such as hydrogen, is supplied from a pressurised supply and the oxidant, such as oxygen or air, is required to be pumped into the cell; for then, in accordance with the invention, pressure energy of the fuel gas can be caused to feed the oxidant through a pump system so that the fuel and oxidant are supplied in definite proportions. Such a system will now be described by way of example with reference to the accompanying drawing of which FIGURE 1 shows diagrammatically a fuel cell system including a pump suitable for supplying the cell with hydrogen from a high pressure source and air as oxidant; FIGURE 2 shows also diagrammatically an addition to the system of FIGURE 1 whereby operation of the cell may be controlled to maintain the moisture level constant. It will be appreciated that the engine and pump combination as indicated in the drawing is merely a diagrammatic representation; since the design of such a combination will be quite evident to those skilled in the art, only this simple form of combination is described and illustrated.

In the system shown in FIGURE 1, hydrogen is suitably stored under high pressure, say, at 100 atmospheres (about 1500 p.s.i.) in a cylinder 10. Alternatively, the hydrogen could be generated under pressure. It passes by way of pressure reducing valve 11 to control valve 12 and through line 13 to the inlet valves 14a and 14b (not shown in detail) of a reciprocating actuator, for an air pump 23. A mechanical, or other, linkage is provided to control the opening and closing respectively of the inlet and outlet valves of the actuator and of the pump; the form of such linkage will be quite evident to those skilled in the art and, in order to simplify the diagram, the linkage is omitted.

The hydrogen is admited by one of the inlet valves, say valve 14a, to one side of the piston 16 in cylinder 15. This causes the piston to move to the right, as seen in the drawing, the hydrogen in the cylinder 15 on the other side of piston 16 passing to line 17 via open outlet valve 18b during this movement and then to the fuel electrode chamber of the fuel cell 19. Piston 16 is linked by connecting rod 21 to the piston of the air pump 23; this piston 22 is therefore moved by piston 16 to cause air to be induced to one side of the piston 22 from air intake 25, on air purifier 26, if required, and the inlet valve 27a. Air on the other side of piston 22 is expelled from cylinder 24 through the outlet valve 28b to line 29 and thence to the oxidant electrode chamber of the fuel cell.

When the piston 16 has completed its stroke to the right, inlet valve 14a and outlet valve 18b are closed and inlet valve 14b and outlet valve 18a are opened so that the piston is driven to the left, as seen in the drawing, by incoming hydrogen. This causes movement of piston 22 similarly in the opposite direction to maintain the supply of air from the pump 23 while at the same time inducing another charge of air to the pump, the inlet valve 27b and the outlet valve 28a now being opened and the other valves 27a and 28b being closed.

These cycles of operation are repeated in turn to maintain continuity in the supply of air as the hydrogen passes through actuator.

The rate of feed of the hydrogen is governed by the diaphragm-operated control valve 12, the diaphragm 20 of the valve operating against a spring (not shown) to maintain the required hydrogen pressure in the fuel cell as the amount of hydrogen varies according to the demand by the cell. If no current is required to be delivered and the cell is disconnected, no hydrogen is consumed. Since typical operating pressures will be 10 p.s.i. in the line between the reducing valve 11 and the control valve 12, 5 p.s.i. in the line 13, 2 in. of water pressure in each of the lines 17 and 29, when the cell is shut off it will be observed that the actuator would have the residual differential pressure drop of 5 p.s.i. to 2 in. of water pressure across it; as the result of the actuator would continue to reciprocate and, would continue to pump air. However, whereas the air would simply pass to atmosphere and the pressure on the air side would assume atmospheric pressure, the hydrogen passed to line 17 would tend to cause the pressure on that side to rise since it would no longer be consumed. If allowed to continue the pressure in line 17 would eventually rise to a pressure far exceeding the 2 in. of water pressure on the air side and this pressure differential across the cell would be detrimental. Of course, immediately the pressure in line 17 starts to rise, the diaphragm 20 will effect operation of the control valve 12 and will close it completely when the pressure has risen a small amount above the normal control pressure of 2 in. of water pressure. To avoid the pressure build-up on the hydrogen side, a pressure release valve 35 is provided which communicates with this side of the cell and is set to open at a pressure wtich exceeds, for example by ½ in. of water pressure, the pressure on the diaphragm 20 necessary to close the valve 12. The hydrogen passed by the actuator in assuming its pressure balanced state is thus vented from the cell itself before a detrimental pressure has built up. The hydrogen thus vented by the valve 35 may, if desired, be consumed in a suitable catalytic burner 36; on the other hand it may be recovered for subsequent use in the cell, as will be apparent.

It will be observed that in operation, because of the direct mechanical linkage between the hydrogen actuator and the air pump, the volumes of hydrogen and of air supplied to the cell are always in the ratio of the swept volumes of the pistons 16 and 22 respectively. If the ratio of these volumes is equal to the stoichiometric ratio of hydrogen to air for the cell reaction, then for a given volume of hydrogen demanded by the cell for delivery of a certain current, the arrangement will automatically provide the requisite amount of air and, in consequence, of oxygen, for the reaction to produce such current. In practice, however, it may be necessary to ensure that there is an excess of air, for instance to entrain moisture from the cell reaction so as to avoid change of electrolyte strength, particularly if the cell is of the type using a so-called trapped electrolyte.

Theoretically, hydrogen at 1500 p.s.i. possesses pressure energy sufficient to pump over seven hundred and fifty times its own volume of air against a back pressure of 2 in. of water pressure. In the case of fuel cell application, this volume ratio far exceeds the practical requirement discussed above and, in practice, the hydrogen pressure would preferably be throttled to a reduced pressure of about 10 p.s.i. In this way, in spite of having to overcome practical essentials, such as frictional losses on the pistons and on gland packings around the connecting rod between the pistons, the volume ratio may still be of the order of twenty against the 2 in. of water back pressure at approximately 40 percent actuator/pump efficiency.

Summarising, therefore, it is simple to arrange that as fuel is consumed by the fuel cell, oxidant is supplied in fixed proportion to the fuel supply. Since water vapour is produced in the cell as the result of the oxidation of the fuel, this water vapour has to be removed otherwise the strength of the cell electrolyte will be affected. The water vapour may be removed by excess oxidant and in the present case this may be arranged by the simple expedient of ensuring that the fuel/oxidant ratio is in excess of the stoichiometric ratio, possibly many times, depending upon the characteristics of the cell.

In a cell arranged to operate at a nominal temperature, the amount of water vapour produced for a given consumption of fuel is known, as is the amount of excess oxidant to remove this water vapour. If the fuel/oxidant ratio is chosen to give this amount of excess oxidant then, in theory, regardless of the current being taken from the cell, and hence fuel consumed, the quantity of oxidant should always be such as to remove the water vapour produced and, again theoretically, no further control is needed for operation of the cell. In practice, however, there are variations, such as temperature variations in the cell itself and in the oxidant supply, and the moisture content of the latter may also vary. This means that some form of control is required to allow for such variations, but in view of the fact that the present invention permits of maintaining a fixed ratio of fuel/oxidant and therefore a fixed ratio of water vapour produced to input oxidant, use of the invention is particularly advantageous as it is then only necessary to provide what is, in effect, a trim of the oxidant flow through the cell. The arrangement indicated in FIGURE 2 illustrates the simplicity of the control. Air from the pump 23 is fed through line 29 to a diverting valve 37 (a spool type is illustrated by way of example) which is under the control of a device 38; this device may be a differential humidity device or some other sensing device, such as one sensing changes of electrolyte strength. This arrangement serves as a trim to control the proportions of the incoming oxidant supply used for water removal in the cell.

Thus the incoming air is divided into a stream passing via line 39 to the cell and a stream passing direct to the outlet to atmosphere via line 40. The proportion in line 39 will provide the stoichiometric quantity of oxidant together with a normal quantity of excess air to remove the water vapour thus produced. Should the sensing means 38 signal through its appropriate equipment as will be evident to those skilled in the art, that there is a tendency for excess water vapour to remain in the cell, the diverting valve 37 is moved to cause less air to be diverted through line 40 and more to pass into line 39 until such time as conditions have been corrected; the valve 37 may then be returned to its normal setting or even moved to a position in which more air is diverted through line 40 as will be well understood.

In one example, the flow of hydrogen from a pressurized source is arranged to cause about eight times the stoichiometric volume of air to be pumped and the characteristics of the cell and conditions of operation are such that about five times normally flows through line 39 to the cell while about three times is diverted through line 40 to by-pass the cell. In that way there is latitude for the diverting means to operate to allow for all eventualities of requirements for water removal.

The invention therefore provides the basis for a very simple automatic control for fuel cell operation, particularly for fuel cells of the trapped electrolyte type. As the cell terminals 30 are incorporated in an electric circuit, hydrogen will be consumed at a rate depending upon the current demanded and the oxidant will combine to form water at the same time as the current is generated. Depletion of the hydrogen in a line 17 causes valve 12 to operate to increase the hydrogen pressure in line 13; thereupon the hydrogen actuator commences to feed more hydrogen to the cell and at the same time to replenish the air (oxygen) supply. Because the air supply is in excess of the stoichiometric quantity for reacting the quantity of hydrogen consumed there will be excess air available to take off the moisture formed—in fact the diverting means will probably be set to reduce to a minimum the amount of air diverted as the cell will probably be cold and the maximum drying effort will be required. As steady running conditions are achieved the controls will gradually assume normal settings.

Although it will be quite evident that the actuator/pump assembly will need to be much more elaborate than the simple schematic assembly described, there is no necessity to give details of a suitable practical assembly. The scope of the present invention is not limited to the particular arrangements herein described. Care will have to be taken, however, in other designs of apparatus, to avoid high losses such as a rise from frictional forces in pistons and glands, if any, and/or other moving mechanical parts. Especially where the sources of pressurized fluid is at comparatively low pressure, as in the case, say, of a Kipps-type generator, as will be preferable to utilise a device having relatively high mechanical efficiency. The designs of such device will, however, be straightforward and details are not therefore included.

I claim:

1. A fuel cell system wherein oxidant is pumped from an oxidant source in controlled proportion to the fuel supply by energy of pressurized fuel fluid which comprises a fuel electrode, an oxidant electrode, a pressurized fuel source, pump means comprising a first chamber and a second chamber, each of said chambers being divided into first and second parts, said first chamber being connected by duct means to said pressurized fuel source and said fuel electrode through valve means that supplies fuel to the first part of said first chamber when fuel in the second part of said first chamber may flow to said fuel electrode and then switches flow of fuel to the fuel electrode from the first part while supplying fuel from said pressurized source to the second part of said first chamber, said second chamber being connected by duct means to said oxidant source and said oxidant electrode through valve means that supplies oxidant to the first part of said second chamber when oxidant in the second part of said second chamber may flow to said oxidant electrode and then switches flow of oxidant to the oxidant electrode from the first part while supplying oxidant from said oxidant source to the second part of said second chamber, first volume change means associated with said first chamber to progressively alternate the volume capacities of the first and second parts of said first chamber, said first volume change means being energized by pressure energy of said fuel, second volume change means associated with said second chamber to progressively alternate the volume capacities of said first and second parts of said second chamber and means connecting said first volume change means with said second volume changes means to energize said second volume change means from motion of said first volume change means.

2. A fuel cell system as claimed in claim 1 wherein said second chamber has a volume capacity at least equal to the volume capacity of said first chamber whereby said pump means pumps oxidant to said oxidant electrode in a proportion at least substantially in the stoichiometric ratio to the fuel supply.

3. A fuel cell system as claimed in claim 2 wherein the volume capacity of said second chamber is in excess of the volume capacity of said first chamber whereby flow of oxidant in the fuel system is in excess of said stoichiometric ratio and water vapor formed as a result of the cell reaction is removed from the cell by entrainment with excess oxidant.

References Cited

UNITED STATES PATENTS

| 3,160,528 | 12/1964 | Dengler et al. | 136—86 |
| 3,152,016 | 10/1964 | Drushella | 136—86 |
| 3,106,494 | 10/1963 | Thorsheim | 136—86 |
| 2,813,398 | 11/1957 | Wilcox | 136—86 |

WINSTON A. DOUGLAS, Primary Examiner

H. A. FEELEY, Assistant Examiner